Feb. 24, 1970     J. L. CONNER ET AL     3,497,094
TRUCK LOADING AND UNLOADING APPARATUS
Filed Feb. 14, 1968     5 Sheets-Sheet 1
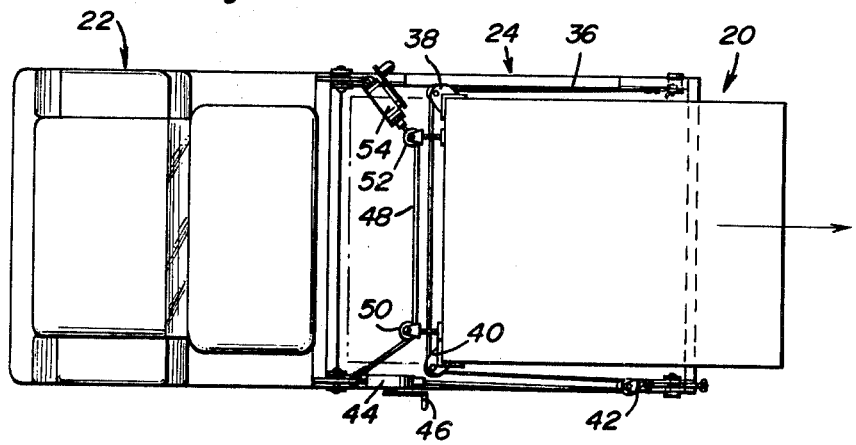
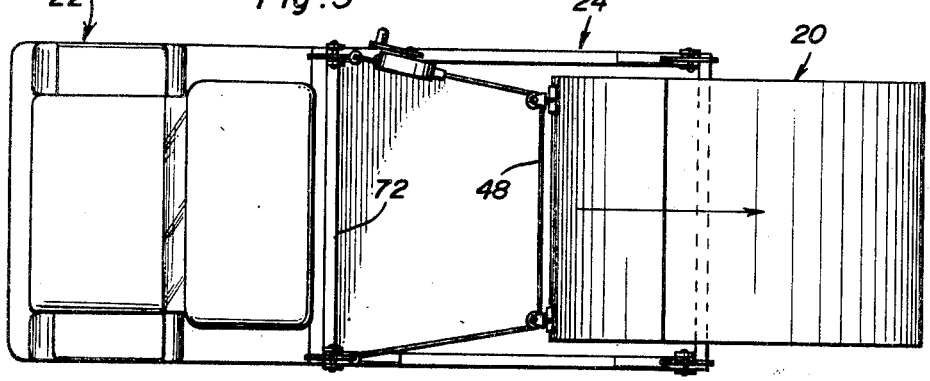
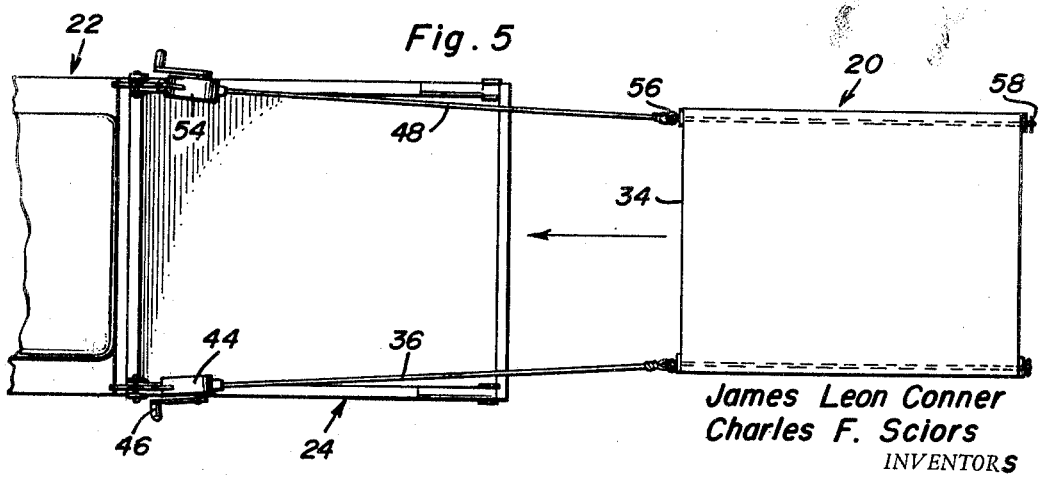
James Leon Conner
Charles F. Sciors
INVENTORS

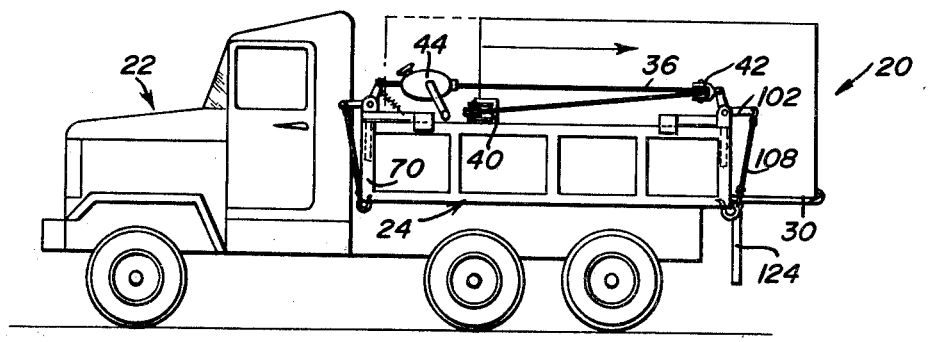
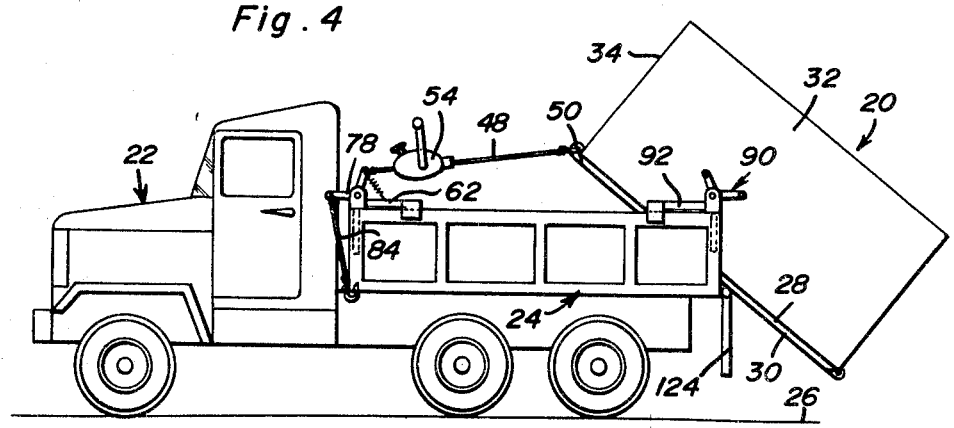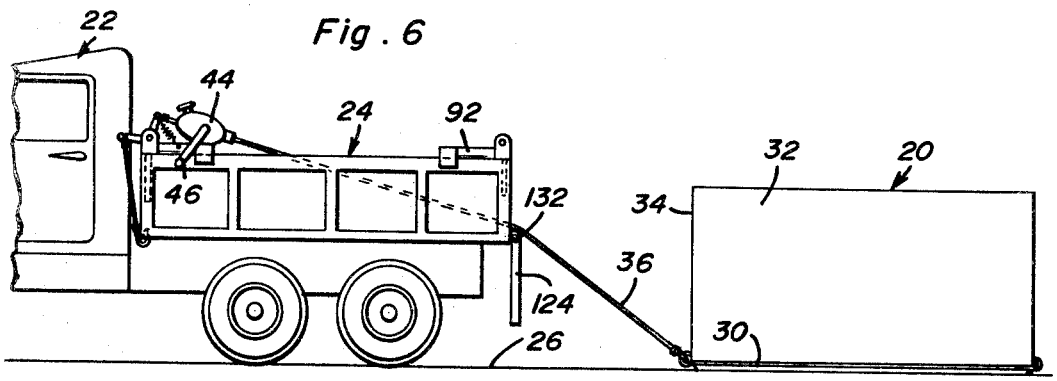

Feb. 24, 1970  J. L. CONNER ET AL  3,497,094
TRUCK LOADING AND UNLOADING APPARATUS
Filed Feb. 14, 1968  5 Sheets-Sheet 3

James Leon Conner
Charles F. Sciors
INVENTORS

BY *Clarence A. O'Brien*
*and Harvey B. Jacobson*
Attorneys

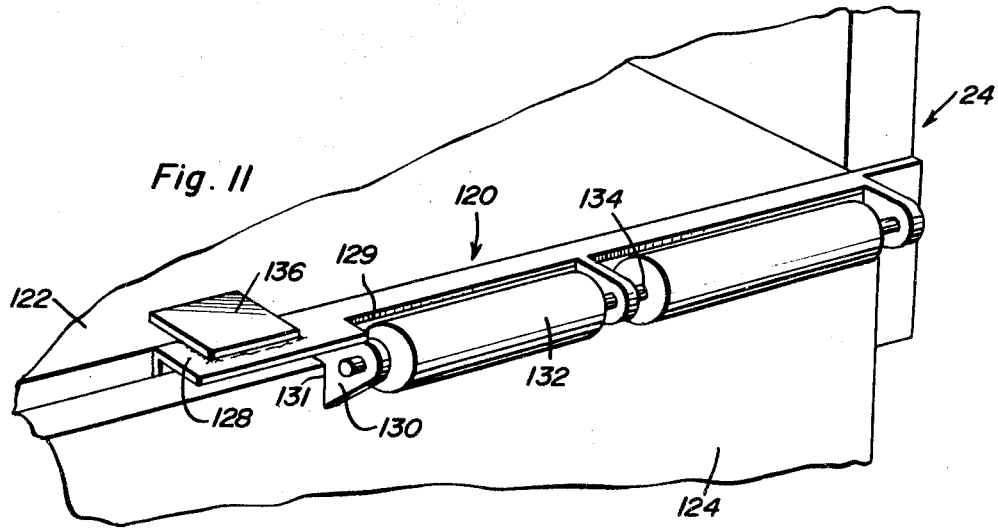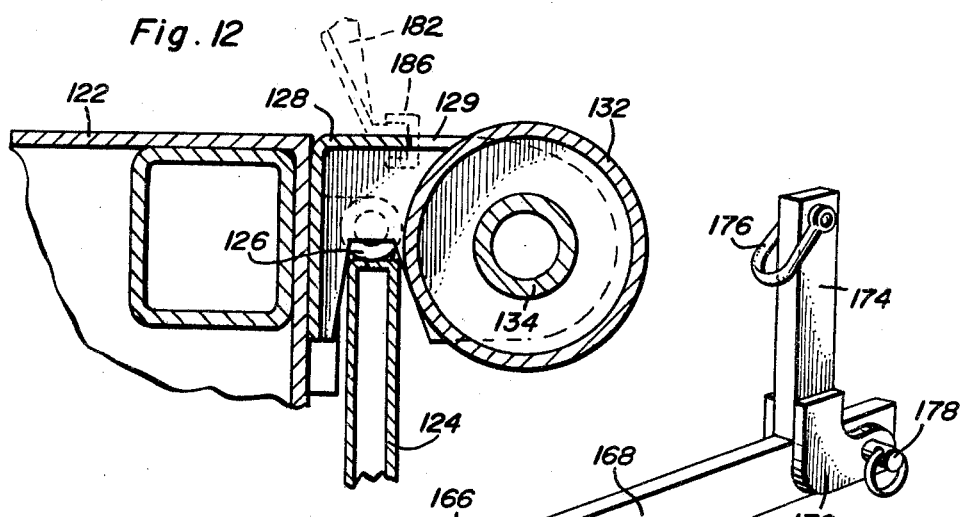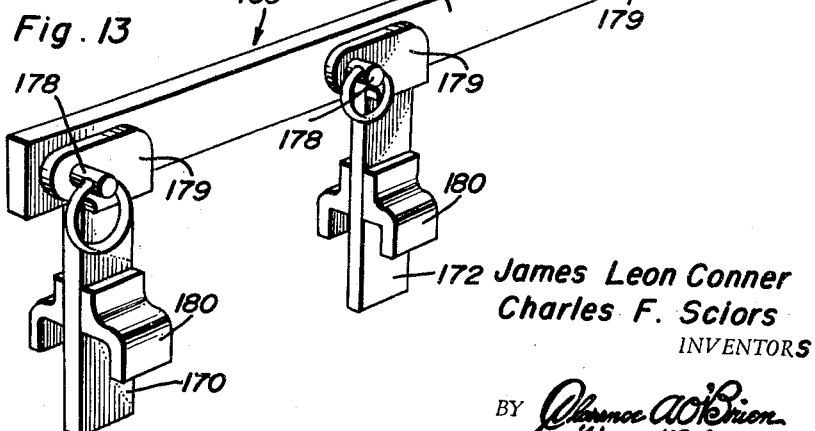

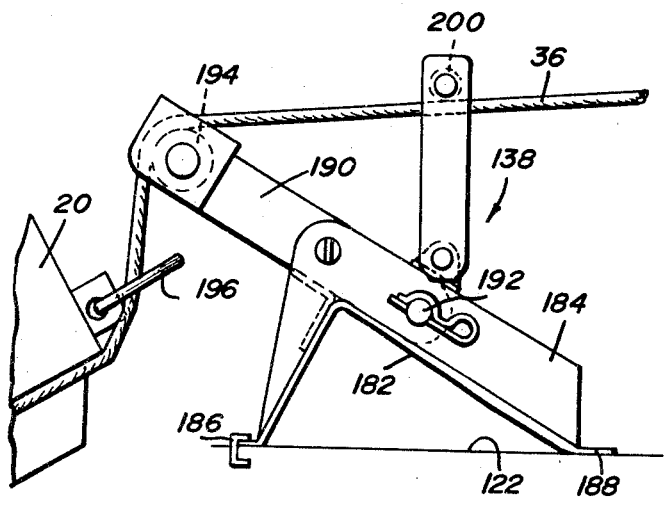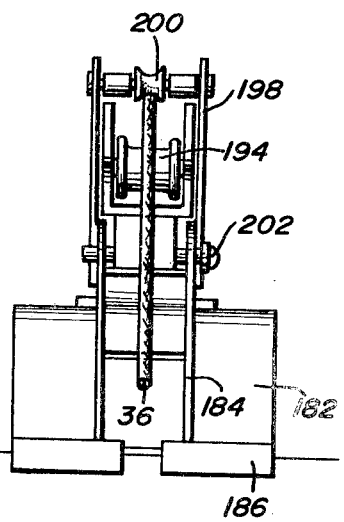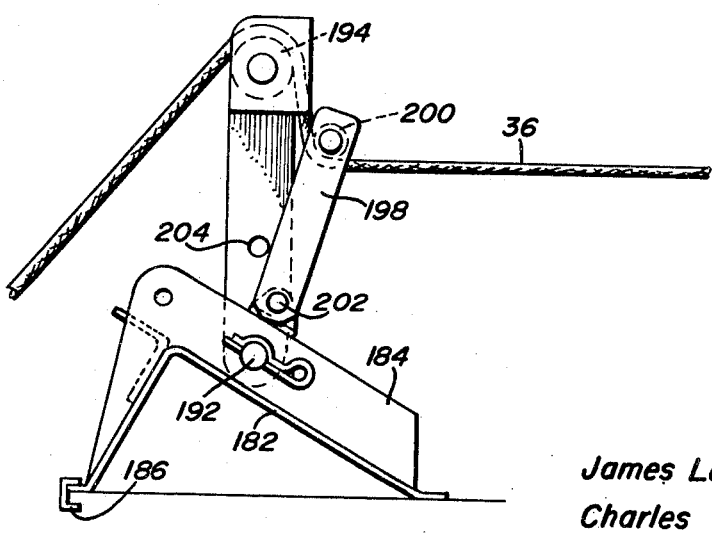

United States Patent Office 3,497,094
Patented Feb. 24, 1970

3,497,094
TRUCK LOADING AND UNLOADING
APPARATUS
James Leon Conner, Bel Air, and Charles F. Sciors, Lanham, Md., assignors to Dichner Mobile Systems, Inc., a corporation of Maryland
Filed Feb. 14, 1968, Ser. No. 705,463
Int. Cl. B60p 1/64, 1/14; B66d 1/00
U.S. Cl. 214—517                                10 Claims

ABSTRACT OF THE DISCLOSURE

An apparatus and procedure for loading a load unit such as a shelter or pallet onto an elevated vehicle body and unloading the load unit by employing cable assemblies and winch mechanisms associated therewith and attached to the load unit and body in particular relationships to enable the load unit to be loaded onto and unloaded from a body such as a truck body to the ground surface without the use of ramp, skids, external elevators, lift trucks or other lifting devices.

Currently, to facilitate handling, storage or the like, various articles and devices are mounted on pallets or positioned within shelter units or the like which are characterized by having a rigid bottom structure. While such arrangements facilitate handling of various articles and equipment, it is sometimes difficult to load and unload the shelter units or pallets from a truck body when the shelter unit or pallet is resting upon the ground surface or is to be placed upon the ground surface. If external lifting equipment is available such as a fork lift truck or the like, the loading and unloading of such load units is relatively simple. However, in many instances, the load unit is to be delivered to or picked up from a remote location such as in the field where external lift equipment is not available and where insufficient manpower is available to lift and handle the load unit or remove the load unit from the truck body.

Accordingly, it is an object of the present invention to provide a relatively simple apparatus which can be easily stored in a compact manner within the truck so that load units such as shelter units, pallets or the like, may be easily and efficiently unloaded from an elevated truck body to a ground surface or loaded onto the elevated truck body from the ground surface with the apparatus and technique involved enabling the loading and unloading operation to be performed by one person although the operation is more efficiently performed by two people, one at each side of the truck body.

Another object of the present invention is to provide a loading and unloading apparatus in accordance with the preceding object having structural units adapted to be mounted on the truck body with no modification whatsoever and to maintain the shelter unit or pallet under complete control at all times during the loading and unloading operation.

In carrying out the objects of the invention, a cable assembly is employed which is associated with a winch structure to enable the load unit to be forced rearwardly out of the truck body in a controlled manner so that the rear end thereof will tilt downwardly and ultimately engage the ground surface and the front end of the load unit will subsequently be permitted to move off of the truck body and lowered to the ground surface. In loading the shelter unit, the reverse procedure is used in that the front end of the shelter unit is elevated and moved forwardly with the cable assembly attached to the rear of the shelter unit and extending under the rigid bottom thereof for elevating the front end of the shelter unit while at the same time moving the shelter unit toward the truck body. The cable assembly is entrained over a roller and elevating device at the rear of the truck body to enable the front end of the shelter unit to be elevated as it approaches the rear of the truck body so that it may be elevated to a point above the rear edge of the truck body for movement onto the truck body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a truck body illustrating the manner in which the load unit is moved off of the truck body;

FIGURE 2 is a side elevational view of the arrangement of FIGURE 1;

FIGURE 3 is a top plan view of the arrangement illustrating the load unit in which the rear end has tilted downwardly and the cable assembly for moving the rear unit rearwardly has been removed;

FIGURE 4 is a side elevational view of the construction of FIGURE 3;

FIGURE 5 is a plan view of the truck body and load unit illustrating the relationship thereof as the load unit is to be pulled into the truck body from a position on the ground surface;

FIGURE 6 is a side elevational view of the construction of FIGURE 5;

FIGURE 11 is a perspective view of a roller assembly disposed at the rear edge of the truck body for rollingly engaging the load unit especially when loading the load unit onto the truck body;

FIGURE 12 is a detailed sectional view taken substantially upon a plane passing along section line 12—12 of FIGURE 11 illustrating the structural details of the roller assembly and the association thereof in relation to the tailgate;

FIGURE 13 is a perspective view illustrating a foldable type of attaching bracket for association with the truck body;

FIGURE 14 is an end view of a swing type of elevating apparatus for the front end of the shelter unit as it approaches the rear of the truck body for elevating the shelter unit to engage the roller at the rear of the truck body;

Figure 7:
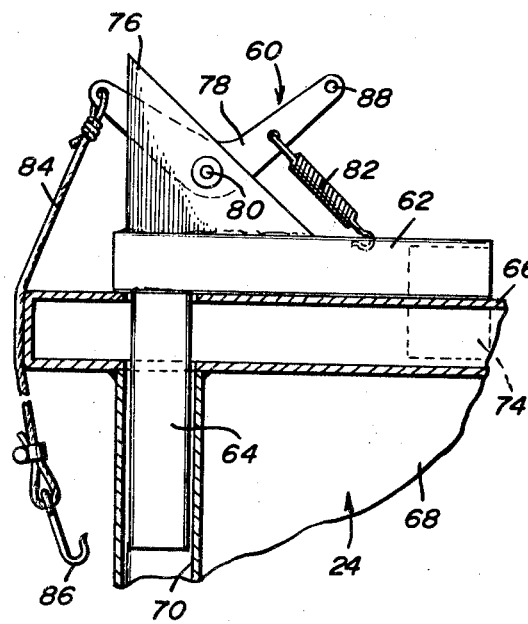
FIGURE 7 is a detailed side elevational view of the structure at the forward end of the truck body for anchoring the cable assembly.

FIGURE 15 is a side elevational view of the elevator unit of FIGURE 14 illustrating one position of the elevating mechanism and its association with the shelter unit and truck body; and FIGURE 16 is a side elevational view of the elevator unit similar to FIGURE 15 illustrating the swingable link in another position at which point the shelter unit has been elevated above the roller at the rear edge of the truck body.

The load unit is generally designated by the numeral 20 and the truck is generally designated by the numeral 22 in the drawings with the truck having a load carrying body 24 thereon with the truck and truck body being conventional in construction as is the load unit 20. The present invention involves the loading of the load unit 20 onto the truck body 24 from a ground surface 26 and unloading the load unit 20 from the truck body 24 back onto the ground surface 26. The load unit 20 is in the form of a shelter unit or pallet construction which has a rigid bottom structure 28 with skids or longitudinal ribs or projections 30 thereon. Also, the shelter unit 20 may have upstanding sidewalls 32 and end walls 34 with at least the front end wall 34 being rigid in relation to the bottom 28.

With the load unit 20 disposed completely within the load body 24, a cable 36 has one end thereof attached to the rear of the load body 24 at one end thereof and is entrained over a pulley assembly 38 engaging the corresponding front corner of the load unit 20. The cable 36 then extends across the front of the load unit 20 and is entrained over a corner pulley unit 40 engaged with the opposite front corner of the load unit 20 and from there passes rearwardly along the opposite side of the load unit 20 and is entrained over a pulley assembly 42 connected to the opposite rear corner of the truck body 24. The cable 36 then extends forwardly into a manually operated winch construction 44. The winch construction 44 includes a handle 46 and is of a type that is engaged with the cable 36 and moves the cable through the winch construction. One type of commercially available winch construction that has been found effective for use in this orientation is a type disclosed in U.S. Patent No. 2,585,101, issued Feb. 12, 1952. The opposite end of the winch structure is anchored to the front of the truck body 24 so that as the cable 36 is pulled forwardly through the winch structure 44, the front end of the load unit 20 will be forced rearwardly toward the rear end of the truck body 24 as illustrated by the arrow in FIGURES 1 and 2.

To prevent the load unit 20 from uncontrolled rearward movement toward the rear of the body 24 such as might occur if the truck is setting on a downward incline or in the event the load unit is heavily loaded at the rear and relatively lightly loaded at the front, there is provided a control cable or restraining cable 48 which has one end thereof anchored to the front of one side of the truck body 24 and entrained through a pair of pulley assemblies 50 and 52 mounted on the front of the load unit 20. The opposite end of the cable 48 is engaged with a winch construction 54 similar to the winch 44 which has the opposite end thereof anchored to the opposite side of the truck body 24. Thus, as one person operates the winch 44 to shorten the effective length of the cable 36 and move the load unit 20 rearwardly, another person will operate the winch 54 to enable the effective length of the cable 48 to elongate so that the load unit 20 is under control at all times. Of course, a single operator could employ the mechanism by sequentially operating the winches 44 and 54 but it, of course, would take considerably longer for a single operator to operate both winches.

After the load unit 20 has been moved rearwardly to a point that it is overbalanced to the rear such as illustrated in FIGURE 4, it will tilt with the forward end thereof extending upwardly and the rear end tilting downwardly. After this point has been reached and passed, the cable 36 is no longer necessary since it is no longer necessary to force the load unit 20 rearwardly. At this point, the cable 36, the corner pulley assemblies 38 and 40 and the winch assembly 44 may be disconnected and removed. As the rear end of the load unit 20 reaches the ground surface, it may become necessary to release the brake on the truck or take the truck out of gear to enable the downward and forward force exerted on the rear of the truck body by the load unit 20 to move the truck forwardly so that the front end of the load unit 20 will move outwardly beyond the rear end of the load body 24. This movement, of course, is controlled by operation of the winch 54 which will enable the load unit to be lowered slowly and gently to the ground surface 26. In some instances, it also may be necessary to actually have a person drive the truck forward slightly in the event the truck is setting on an incline and will not roll forwardly due to the forces exerted on the truck body by the load unit 20. In any event, the final position of the load unit 20 is substantially as illustrated in FIGURES 5 and 6 which is also the initial position of the load unit 20 when it is to be loaded onto the truck body 24. When the load unit 20 is being unloaded, the cable 48 is entrained through pulleys attached to the front of the load unit 20 by any suitable clevis or shackle mechanism. When the load unit 20 is to be loaded onto the truck, both winches 54 and 44 are employed and the cables 36 and 48 which, of course, have been removed from the pulley assemblies 42, 50 and 52 respectively, are extended rearwardly from the rear of a truck body and engaged with the load unit at the front bottom thereof as at 56 and then extend rearwardly under the rigid bottom 28 and attached to the rear bottom corner of the load unit 20 as at 58. After connection in this manner, the winches 54 and 44 are operated by the two operators and the load unit 20 will be pulled toward the truck body and at the same time, the forward end thereof will be elevated toward the rear edge of the truck body 24 and pulled into the truck body. The cables are connected to the rear of the load unit and also to the front thereof by a clevis or the like to prevent the rear of the load unit to be pulley forwardly independently of the front end which would tend to tilt the load unit 20 in a vertical direction. When the load unit 20 is approximately two to three feet from the front of the truck body 24, the cables are sequentially disconnected from the front of the load unit 20 so that it can be pulled completely into the truck body.

FIGURE 7 illustrates the structure employed for anchoring the winch 44, winch 54 and one end of the cable 48 to the forward end of the load body 24 with the anchor structure generally being designated by numeral 60 and which includes a tubular structural member 62 in the form of a hollow square tube or the like having a depending hollow tubular member 64 welded to the forward end thereof. The tubular structural member 62 rests against the top surface of the top rail 66 on the upper edge of the sidewall 68 of the load body with the depending tubular member 64 telescoped into the normally provided tubular socket 70 at the forward end of the side rail and at each edge of the front wall 72 of the load body. A pair of depending lugs 74 are welded to the rearward end of the tubular member 62 to retain it in alignment with the top rail 66. Extending upwardly from and welded to the tubular member 62 at the forward end thereof is a pair of triangular gusset plates 76 which pivotally support a bell crank member 78 at its apex by a pivot bolt or pin 80. A tension coil spring 82 interconnects the rearwardly extending arm of the bell crank 78 and the tubular member 62 to retain the forwardly extending arm of the bell crank 78 inclined upwardly so that a short anchor cable 84 attached to the forwardly extending arm of the bell crank lever 78 is retained in position with the lower end thereof provided with a hook 86 which is engaged with the lower end of the socket 70 as illustrated in FIGURE 2. The rearwardly extending arm of the bell crank lever 78 is provided with an eye 88 to which is attached a clevis or clevises for the winch 44 and the end of the cable 48.

Figure 8:
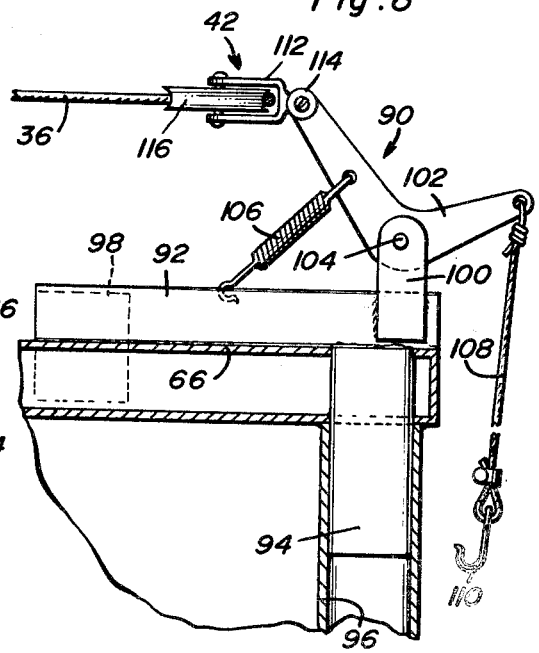
FIGURE 8 is a side elevational view of the construction at the rear of the truck body for providing an anchor for a portion of the cable assembly.

FIGURE 8 illustrates the supporting arrangement for the pulley assembly 42 which is generally designated by the numeral 90 and includes a longitudinal tubular member 92 and a depending tubular member 94 at the rear end thereof extending into the rear tubular socket 96 normally provided on the truck body with the tubular member 92 overlying the top rail 66 thereof. Lugs 98 are provided for retaining the tubular member 92 on top of the top rail 66 and upwardly extending support lugs 100 are welded to the rearward end of the tubular member 92.

The lugs 100 pivotally support a bell crank lever 102 by a pivot pin or bolt 104 with a tension coil spring 106 extending between the forwardly extending arm of the bell crank 102 and the tubular member 92 to retain an anchor cable 108 taut. The lower end of the anchor cable 108 is provided with a hook 110 to engage in the lower end of the socket 96 as illustrated in FIGURE 2 with the upper end thereof being attached to an eye formed in the rear end of the bell crank lever 102. The other end of the bell crank lever 102 is connected to a yoke 112 by a pivot pin or bolt 114. The yoke 112 rotatably supports a pulley 116 over which the cable 36 is entrained. When the cable 36 is to be removed or is no longer in use, the pin or bolt 114 may be easily removed thus enabling removal of the pulley assembly 42.

FIGURE 11 illustrates a roller assembly generally designated by the numeral 120 which is mounted at the rear edge of the bottom or floor 122 of the truck body 24 in such a manner that the tailgate 124 depends from the rear edge of the body and is supported by the usual hinges 126. Attachment of the roller assembly 120 with the truck body will not require alteration of the truck body. The roller assembly 120 includes a substantially angle-shaped plate 128 having the vertical flange thereof engaging the end of the truck body and the horizontal flange thereof extending rearwardly therefrom and generally in alignment with the floor surface 122. A plurality of spaced gussets 130 are rigidly fixed to the flanges of the angle-shaped plate 128 and project beyond the rear edge thereof for supporting an elongated sectional roller 132 which is supported by a shaft 134. As illustrated in FIGURE 12, the top surface of the roller 132 is disposed sligthly above the top surface of the horizontal flange of the angle-shaped plate 128 and also slightly above the top surface of the load body 122. Further, the roller 132 is disposed rearwardly of the tailgate 124.

As illustrated in FIGURE 11, the top flange of the angle-shaped plate 128 is notched as at 129 for receiving the roller 132 which is divided into two sections as illustrated in FIGURE 11 although the length of the roller 132 may be varied as desired. Also, the gussets 130 are notched as at 131 to engage over the top edge of the tailgate 124 to supportingly mount the roller assembly 120 in position. Also, a plate or tab 136 is provided on the angle-shaped plate 128 for engagement with the surface 122 on the truck body 24 and the depending flange of the angle-shaped plate 128 may be notched out or cut away to receive the hinge structure 126 which supports the tailgate 124 in a conventional manner. With this construction, the roller 132 has a top surface thereof disposed slightly above the bottom surface 122 of the load body and the roller 132 extends rearwardly beyond the tailgate 124 so that it will rollingly engage the skids or ribs 30 on the bottom 28 of the load unit during the loading and unloading operation. The roller assembly 120 will be duplicated on each side of the truck body and will engage the cable 48 during the unloading operation and the cables 36 and 38 during the loading operation with the cable elevating unit generally designated by the numeral 138 as illustrated in FIGURES 14-16 employed in combination with the roller unit when loading the load unit in a manner described hereinafter.

Figure 9:
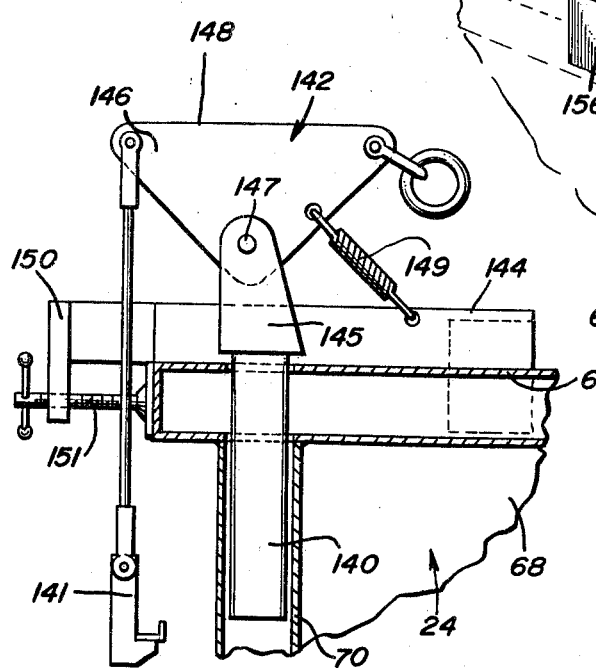
FIGURE 9 is a side elevational view of another type of bracket at the front of the truck body for anchoring the cable assembly.

FIGURE 9 illustrates another type of anchor bracket generally designated by the numeral 142 and which may be employed in lieu of the anchor bracket 60 illustrated in FIGURE 7. The anchor bracket 142 includes a longitudinal rail 144 comparable to the rail 62 pivotally supporting a generally triangular plate 146 havng a substantially straight top edge 148. A spring 149 comparable to spring 82 interconnects the plate 146 and the rail 144 and the forward end of the rail 144 has a depending lug 150 thereon having a screw-threaded clamp 151 associated therewith for clamping the anchor 142 to the truck body 24. The plate 146 is supported from the rail 144 by lugs 145 and a pivot pin 147 equivalent to the lugs and pivot pin for supporting the bell crank 78 in FIGURE 7. The cable attached to the forward end of the plate 146 is the same as the cable 84 in FIGURE 7 and the hook 141 at the lower end of the cable is shaped to conform with the lower end of the stake socket 70. The rail 144 includes a depending member 140 equivalent to the depending member 64 illustrated in FIGURE 7 to be telescopically received and clamped into the stake socket 70 by using the clamp screw 151.

A similar type of triangular plate may be employed at the rear anchor structure by employing a triangular plate in lieu of the bell crank 102 as illustrated in FIGURE 8.

Figure 10:
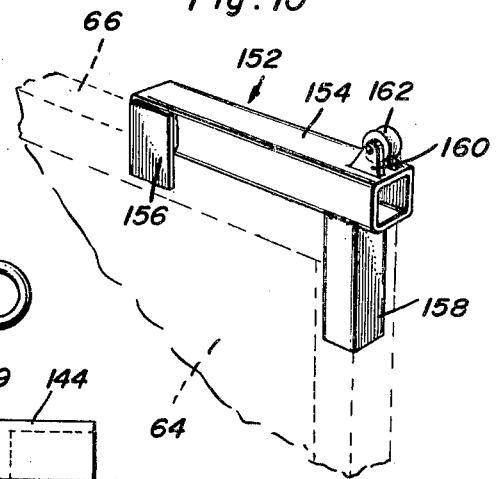
FIGURE 10 is a perspective view illustrating another type of bracket employed at the rear of the truck body.

FIGURE 10 illustrates another bracket 152 used at the rear upper corner of the load body 24 including a tubular member 154 similar to the tubular member 92, lugs 156 at one end thereof similar to lugs 98 and a depending tubular member 158 similar to the tubular member 94 and associated with the truck body in the same manner. Upstanding lugs 160 are provided on the tubular member 154 for rotatably mounting a grooved pulley 162 thereon for receiving the cable 36 so that the hooked end thereof may be extended downwardly to engage with the bottom of the truck body 24 thus replacing the bracket 90 which anchors the terminal end of cable 36.

FIGURE 13 illustrates a bracket structure generally designated by the numeral 166 which may be employed in lieu of the front anchor structure 60 or the rear anchor structure 90 for supporting the cables, winches and the like from the truck body. The anchor structure 166 includes an elongated bar 168 adapted to be disposed along the upper surface of the top rail 66 of the truck body. Attached to the bar 168 is a bar 170 at one end thereof, an intermediate bar 172 and a second end bar 174 which has a loop or clevis 176 connected to the free end thereof. Pivot pins 178 connect the bars 170–174 to the bar 168 in an offset manner by the use of angled brackets. The bars 170 and 172 have offset pairs of lugs 180 thereon to enable the lower ends of the bars 170 and 172 to be inserted into slots or sockets in the top rail with the lugs 180 engaging the opposite sides of the rail. The upper ends of the bars 170 and 172 abut against the under edge of the bar 168 with the pivot pins 178 enabling the bars 170 and 172 to be swung upwardly into a folded condition with bar 172 along the undersurface of the bar 168 and bar 170 along the top surface thereof. The bar 174 is swingable about pivot pin 178 to an upright position at which point it will be engaged in the top surface of the bar 168 so that it will be rigidly retained in the upright position for engagement by one of the winches or cables. This construction enables the bar 174 to be swung to a stored position generally alongside the underside of the bar 168.

FIGURES 14–16 disclose the elevator arrangement for the front end of the load unit 20 generally designated by the numeral 130 and includes a substantially L-shaped plate 182 provided with spaced upstanding lugs or plates 184 on the exterior surface thereof. The rearward end of the plate 182 is provided with a forwardly opening channel-shaped hook 186 to engage the edge of the notch 129 illustrated in FIGURES 11 and 12. The opposite end of the plate 182 is flat as at 188 to engage the floor surface 122 of the truck body 24.

Pivotally mounted between the plates 184 is an elongated lift arm or link 190 pivotally supported at one of its ends by a pivot pin 192 extending between the plates or lugs 194. The free end of the lift arm 190 extends rearwardly and upwardly to a point above and generally in alignment with the roller 132 with the upper end of the lift arm 190 having a guide roller 194 journaled therebetween with the cable 36 entrained thereover. It is pointed out that a duplicate elevator structure 138 will be employed at both sides of the truck body. The cable 36 extends through a clevis 196 on the forward end of the load unit 20 and then rearwardly for attachment to the rear of the load unit 20 in the manner well known.

As the load unit 20 approaches the roller 132, it will also approach and engage the end of the lift arm 190. At this point, subsequent movement of the cable 36 will cause the lift arm 190 to pivot upwardly about the pivot pin 192 towards a vertical position such as illustrated in FIGURE 15. However, if there was nothing to constrain the lift arm, it would pivot on rearwardly and let the cable 36 down to a lowered position. In order to prevent this movement, a pair of links 198 having a cable-engaging roller 200 journaled between the outer ends thereof is supported on a pivot pin 202 carried by the plates 184. If desired, the links or straps 198 could be pivoted on the pivot pin 192. With the roller 202 overlying the cable 36 and the roller 194 underlying the cable 196, when the lift arm 190 approaches its vertical position, the links 198 will prevent the lift arm 190 from pivoting freely to the rear inasmuch as the arc in which the roller 200 is moving is different from the arc in which the roller 194 is moving. Inasmuch as the cable 36 cannot lengthen, the lift arm 190 will be stabilized with the front end of the load unit 20 elevated above the roller 132 and forwardly of the roller so that the cables 36 and 48 can be sequentially loosened and the elevator assembly removed.

The lift arm 190 may be locked in position by employing a lockpin through an aperture 204 therein and corresponding apertures in the apex of the flange or plate 184.

By employing the elevating assembly, the forward end of the shelter unit or load unit 20 is elevated so that the skids 30 thereon may be elevated to a position above and forwardly of the roller 132. Thus rather than the sharply inclined forward ends of the skids engaging the roller 132, the forward end of the load unit 20 will be elevated by the lift arm and the cable passing thereover and attached to the load unit. The lock for the lift arm 190 assures that the guide roller 194 will be retained in position during movement of the load unit 20 to a position generally illustrated in FIGURE 14. Also, if the elevator arrangement illustrated in FIGURES 14–16 is to be employed as the corner bracket arrangements when unloading the load unit, this also will retain the guide roller in position during such use.

With the cables 36 and 48 extending over the rollers 194 and extending under the front and to the rear of the load unit and being attached to the load unit both at the front and at the rear, the load unit is pulled from the position of FIGURE 6 to an inclined position illustrated in FIGURE 14. At this point, the lockpin is removed and the cable 36 is pulled further forwardly by the winch mechanism with the roller 200 positioned above the cable serving to restrain the lift arm 190 from proceeding completely to the rear. At this point, the cables 36 and 48 may be loosened one at a time with one cable being retained taut while the other is being loosened and the elevating assembly removed. Then after the first loosened cable has been retightened, the other cable may be loosened and the other elevating assembly removed in the same manner. Then, upon subsequent movement of the cables, the load unit can be readily pulled completely into the truck body.

With this unit, the load unit 20 may be easily unloaded from the truck body 24 with the load unit being under control to prevent unwanted free movement of the load unit to its unloaded position which could possibly cause damage to the contents or equipment in the load unit. Also, as the load unit is loaded back onto the truck body, it is also under control at all times to prevent any possibility of accidental dropping or lowering of the load unit which could cause damage to the contents or equipment therein and also possible injury to persons in the adjacent area.

This unit is attached to the truck body with no modification whatsoever to the truck body and is quite simple to use to enable persons such as the usually provided truck driver and helper to effectively load or unload the load unit. The apparatus employed in loading and unloading may be easily stored in a relatively small area on the truck in a container normally provided therefor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for unloading a load unit from a load carrying body disposed in vertically spaced relation to a supporting surface comprising a cable assembly having one end thereof anchored to the load body adjacent the rear thereof and extending forwardly and across the front of the load unit and rearwardly to the rear end of the load body on the opposite side of the load unit, and means to effectively shorten the length of the cable assembly to move the forward end of the load unit toward the rear of the load body, and means connected with the load unit to restrain movement thereof until the rear end of the load unit engages the supporting surface, said means restraining rearward movement of the load unit including a cable assembly having one end connected with the load body adjacent the forward end thereof and extending across and connected to the front of the load unit and extending forwardly to the opposite side of the load body, and means connected with the cable assembly for enabling elongation of the effective length of the cable assembly as the load unit is moved rearwardly to control the rearward movement of the load unit in relation to the load body, roller means across the bottom of the rear of the load body for facilitating movement of the load unit thereover, a cable assembly for loading the load unit onto the load body including the cable assembly for moving the load unit rearwardly and the cable assembly for restraining the load unit during its rearward movement connected with opposite sides of the front and bottom of the load unit and extending under the load unit and connected also to the rear bottom thereof for movement of the load unit toward the load body and lifting of the front end of the load unit to the rear edge of the load body.

2. The structure as defined in claim 1 wherein said roller means at the rear edge of the load body includes a longitudinally elongated roller mounted rearwardly of and slightly above the rear edge of the load body, and an elevated guide roller disposed inwardly of the elongated roller for guiding the cable and orienting the cable above the elongated roller for elevating the front of the load unit above the elongated roller to enable the lower end of the front of the load unit to be engaged with the elongated roller.

3. The structure as defined in claim 2 wherein said guide roller is mounted on a pivotally supported lift arm releasably locked in one elevated position in relation to the elongated roller, said guide roller being movable to a second elevated position at a higher elevation inwardly of the roller for lifting the front of the load unit upwardly and inwardly into engagement with the elongated roller, and means engaged with the cable adjacent the guide roller to limit the movement of the guide roller to prevent movement thereof beyond its second elevated position.

4. An apparatus for unloading a load unit from a load carrying body disposed in vertically spaced relation to a supporting surface comprising a cable assembly having one end thereof anchored to the load body adjacent the rear thereof and extending forwardly and across the front of the load unit and rearwardly to the rear end of the load body on the opposite side of the load unit, and means to effectively shorten the length of the cable assembly to move the forward end of the load unit toward the rear of the load body, and means connected with the load unit to restrain movement thereof until the rear end of the load unit engages the supporting surface, means anchoring the cable assembly to the load body at the forward and rear ends thereof, said means comprising a bracket having one portion engaging the top edge of the load body and a depending member received in a stake socket provided in the load body, and lug means on said bracket for anchoring the cable.

5. An apparatus for unloading and loading a load unit from a load carrying body disposed above a supporting surface comprising unloading cable means operatively engaged with a forward portion of the load unit and extending toward the rear portion of the load body, means iterconnecting the unloading cable means and load body to move the unloading cable means longitudially for exerting a rearward force on the load unit for moving it rearwardly of the load body, restraining cable means operatively connected with the load unit and extending forwardly therefrom for restraining rearward movement of the load unit, means interconnecting the restraining cable means and the load body for controlling logitudinal movement of the restraining cable means to control rearward movement of the load unit, a loading cable assembly for loading the load unit on the load body comprising said unloading cable means and said restraining cable means extending longitudinally under the front of the load unit and connected with the rear bottom portion thereof, said unloading cable means and said restraining cable means extending toward the forward end of the load body for moving the load unit toward the load body and lifting the front end of the load unit when the cable means are moved longitudinally toward the forward end of the load body.

6. The structure as defined in claim 5 together with a roller disposed transversely of the rear bottom edge of the load body for facilitating movement of the load unit an elevated guide roller disposed forwardly of the rear in relation thereto.

7. The structure as defined in claim 5 together with of the load body receiving said unloading cable means and said restraining cable means for elevating the cable means and the front of the load unit above the bottom rear edge of the load body to enable the lower front end of the load unit to be engaged with the load body.

8. The structure as defined in claim 7 wherein said elevated guide roller is mounted on a pivotally supported lift arm releasably locked in one elevated position in relation to the body, said guide roller being movable to a second elevated position at a higher elevation inwardly of the rear edge of the load body lifting the front end of the load unit upwardly and inwardly into engagement with the bottom rear edge of the load body, and means engaged with the cable means adjacent the guide roller to limit the movement of the guide roller to prevent movement thereof beyond its second elevated position.

9. The structure as defined in claim 5 together with means anchoring the cable means to the load body including a bracket having a depending member received in a stake socket in the load body and lug means on said bracket for anchoring the cable means.

10. The structure as defined in claim 9 wherein said lug and depending member are pivotally connected to the bracket to enable folding thereof into a compact condition for storage.

References Cited
UNITED STATES PATENTS

| | | | |
|---|---|---|---|
| 1,561,157 | 11/1925 | Greer | 214—85.5 XR |
| 2,021,952 | 11/1935 | Wren | 214—517 |
| 3,159,295 | 12/1964 | Love | 214—517 |
| 3,262,591 | 7/1966 | Aldropp | 214—517 |
| 3,369,682 | 2/1968 | Breault | 214—85.5 XR |

ALBERT J. MACKAY, Primary Examiner

U.S. Cl. X.R.

214—85.5; 254—149